L. W. SEIVERT.
AUTOMATIC VEHICLE BRAKE.
APPLICATION FILED SEPT. 14, 1916.
1,241,035.
Patented Sept. 25, 1917.
3 SHEETS—SHEET 2.
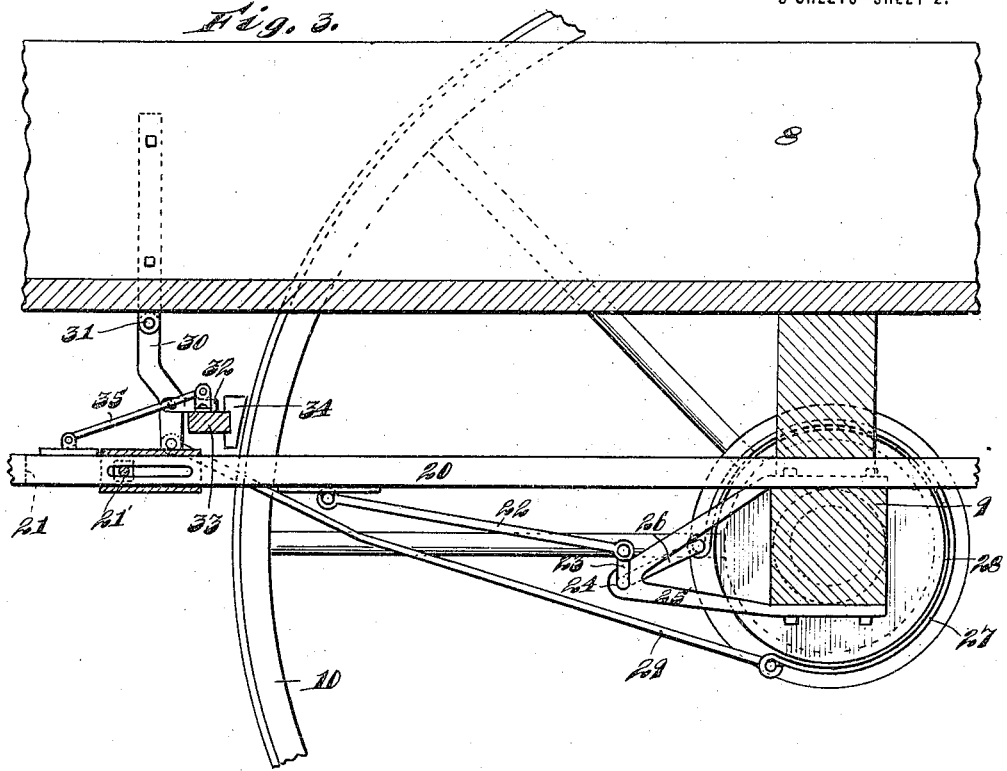
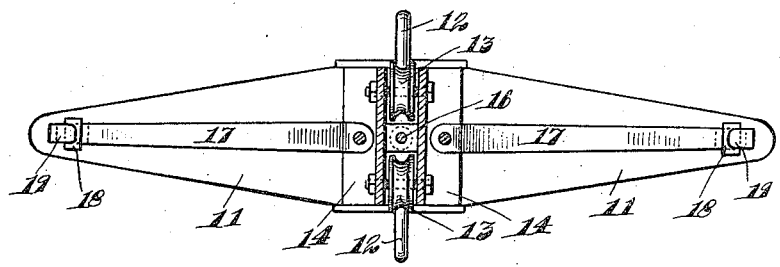
WITNESSES:
C. E. Wessels
B. G. Richards
INVENTOR.
Lawrence W. Seivert,
BY
his ATTORNEY.

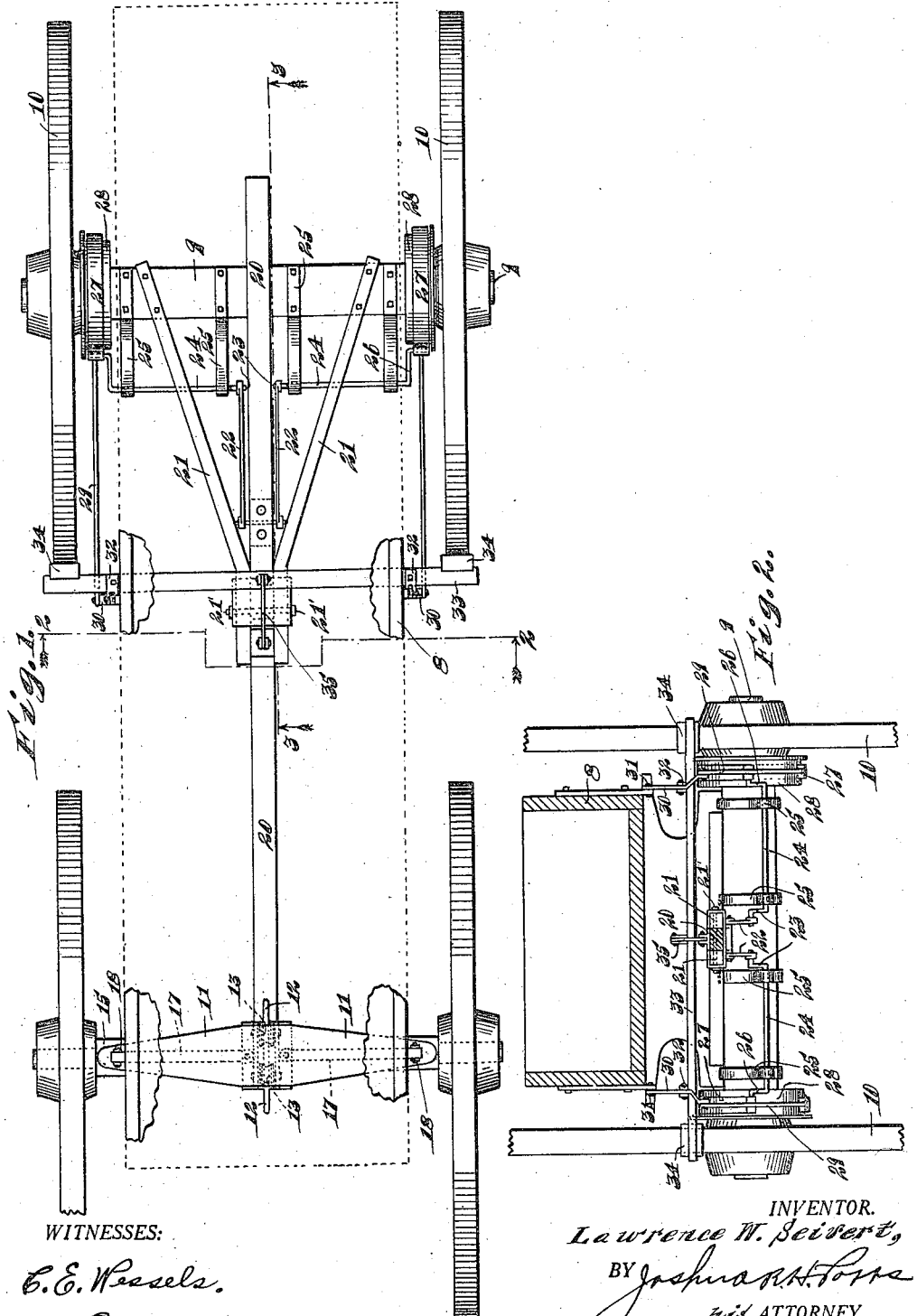

L. W. SEIVERT.
AUTOMATIC VEHICLE BRAKE.
APPLICATION FILED SEPT. 14, 1916.
1,241,035.
Patented Sept. 25, 1917.
3 SHEETS—SHEET 3.
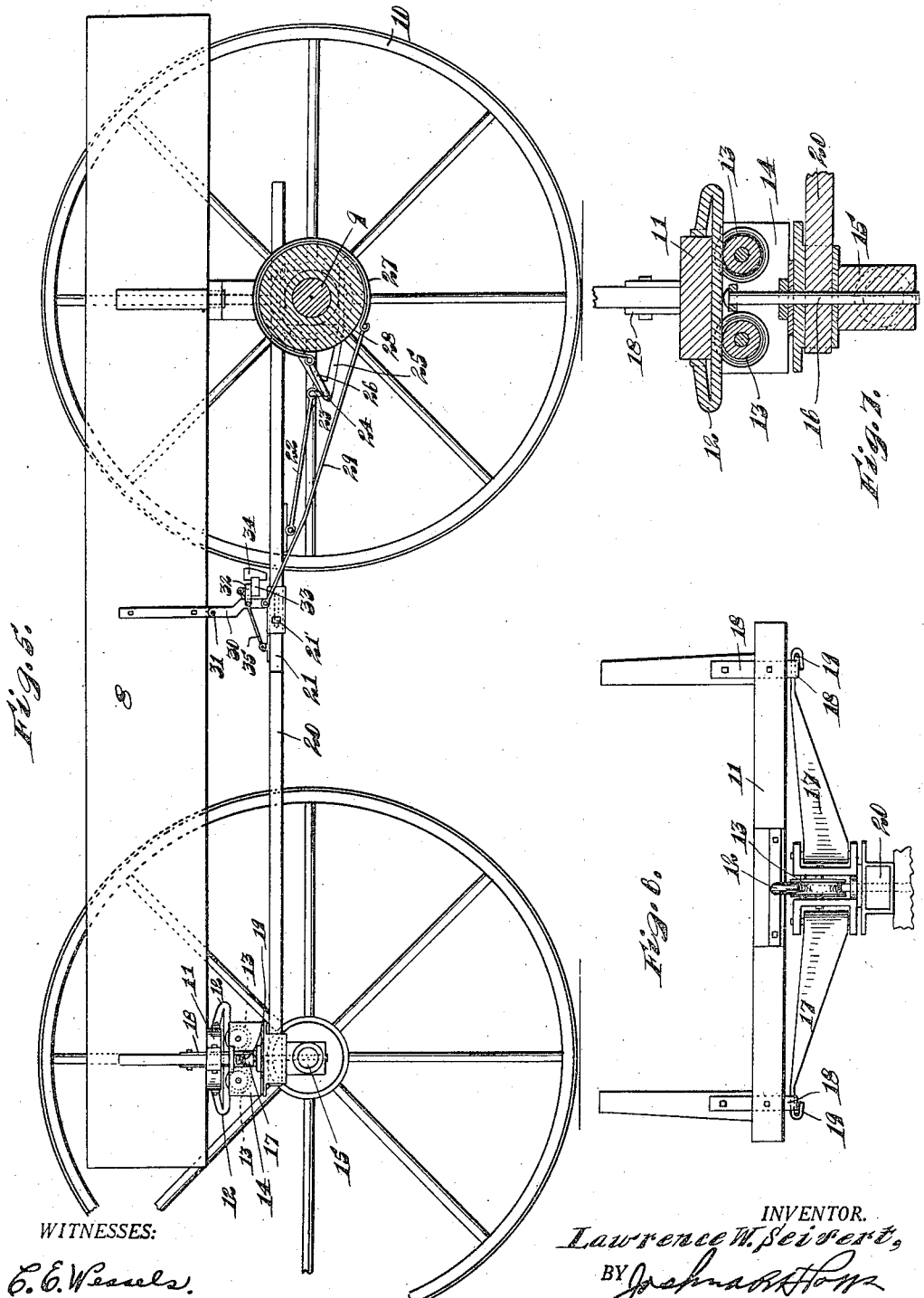

UNITED STATES PATENT OFFICE.

LAWRENCE W. SEIVERT, OF ELKTON, SOUTH DAKOTA.

AUTOMATIC VEHICLE-BRAKE.

1,241,035.

Specification of Letters Patent.   Patented Sept. 25, 1917.

Application filed September 14, 1916. Serial No. 120,167.

*To all whom it may concern:*

Be it known that I, LAWRENCE W. SEIVERT, a citizen of the United States, and a resident of the city of Elkton, county of Brookings, and State of South Dakota, have invented certain new and useful Improvements in Automatic Vehicle-Brakes, of which the following is a specification.

My invention relates to improvements in automatic vehicle brakes and has for its object the provision of an improved construction arranged to automatically apply the brakes of a vehicle which is of simple construction and efficient in operation.

The invention consists in the combinations and arrangements of parts hereinafter described and claimed.

The invention will be best understood by reference to the accompanying drawings forming a part of this specification, and in which, Figure 1 is a top plan view of a running gear of a vehicle provided with braking means embodying my invention, Fig. 2 is a transverse section taken on line 2—2 of Fig. 1, Fig. 3 is an enlarged section taken on line 3—3 of Fig. 1, Fig. 4 is a bottom plan view of a connection between the bolster and the front axle, shown partially in section, Fig. 5 is a longitudinal section of the construction, Fig. 6 is a front view of the construction, and Fig. 7 is an enlarged detail view of the construction of the vehicle body with the front axle.

The preferred form of construction as illustrated in the drawings comprises an ordinary wagon body 8 affixed to the rear axle 9 in any usual or desired manner, said rear axle being provided with the usual rear wheels 10 as indicated. The forward portion of the body 8 is supported on the bolster 11 which is provided on its underside with a track 12 running upon grooved rollers 13 rotatably mounted in registration with each other in a supporting bracket 14. The bracket 14 is secured to the front axle 15 of the wagon by a king bolt 16 as indicated. Stop arms 17 are pivotally connected at their inner ends to the bracket 14 and are slidable at their outer ends through straps or guides 18 on the underside of the bolster 11; the outer ends of arms 17 are provided with downwardly and inwardly bent stop hooks 19 adapted to limit the sliding motion of arms 17. By this arrangement it will be observed that the forward portion of the wagon body 8 is mounted to have limited longitudinal sliding motion with reference to the front axle, so that upon application of draft by the draft animals, the front axle will move forward slightly with reference to the vehicle body, and upon "backing" of the animals, the front axle will have slight rearward motion with reference to the body of the wagon.

The wagon reach 20 is fixed at its forward end to the front axle 16 and at its rearward end rests loosely on the rear axle, the side braces 21 being rigidly secured to the rear axle and having a slot and bolt connection 21' with said reach, so as to permit of the movement of the body above described. Links 22 are connected with the reach 20 and with crank arms 23 on crank arm shafts 24 mounted in suitable arm brackets 25 supported on the rear axle 9. Shafts 24 are provided at their outer ends with crank arms 26 pivotally connected with the ends of corresponding brake bands 27 arranged to encompass the hubs 28 of the corresponding rear wheels 10. The other ends of bands 27 are connected by means of links 29 with levers 30 which are pivotally connected at 31 to brackets secured to the sides of the wagon body 8. Arms 32 are pivotally connected to levers 30 and carry a brake beam 33 provided with brake shoes 34 arranged to be applied to the periphery of the wheels 10. A link 35 is pivoted at one end to the brake-beam 33 and at its outer end to the reach 20 as shown. By this arrangement "backing" of the team causes rearward movement of the reach 20 relatively to the rear axle 9 and the vehicle body 8 thus rocking shafts 24 to apply brake bands 27 and brake blocks 34 as will be readily understood, thus automatically and simultaneously applying the brakes. Forward movement of the team causes forward movement of the reach 20 thus automatically and simultaneously releasing the brakes. The specific arrangement set forth is a simple and efficient one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a vehicle body, front and rear axles provided with wheels, said body being arranged to slide relatively to said front wheels, a brake block arranged to be applied to the periphery of a wheel, a frictional braking band arranged to be applied to the hub of a wheel, a crank shaft mounted upon the rear axle, an operative connection between the front axle and said shaft, an operative connection between said crank shaft and said brake band and an operative connection between said brake band and said brake block, substantially as described.

2. In combination, a vehicle body provided with a front bolster, a rear axle fixed to said body, wheels on said axle, a front axle provided with wheels, a sliding connection between said front axle and said bolster, a reach attached to said front axle and movable with relation to the rear axle, braces having slotted connections with said reach and affixed to said rear axle, a brake band encircling a wheel hub, brake band applying mechanism supported by said rear axle and an operative connection between said reach and said brake applying mechanism, substantially as described.

3. In combination, a vehicle body provided with a front bolster, a rear axle fixed to said body, wheels on said axle, a front axle provided with wheels, a sliding connection between said front axle and said bolster, a reach attached to said front axle and movable with relation to the rear axle, braces having slotted connections with said reach and affixed to said rear axle, a brake band encircling a wheel hub, brake band applying mechanism supported by said rear axle, an operative connection between said reach and said brake applying mechanism, a brake shoe and an operative connection between said brake shoe and said brake band, substantially as described.

4. In combination, a vehicle body provided with a front bolster, a rear axle fixed to said body, wheels on said axle, a front axle provided with wheels, a sliding connection between said front axle and said bolster, a reach attached to said front axle and movable with relation to the rear axle, a brake beam swingingly mounted on said body and equipped with shoes to engage the periphery of the rear wheels and a link connecting said beam and said reach, substantially as described.

5. In combination, a vehicle body provided with a front bolster, a rear axle fixed to said body, wheels on said axle, a front axle provided with wheels, a sliding connection between said front axle and said bolster, a reach attached to said front axle and movable with relation to the rear axle, a brake beam swingingly mounted on said body and equipped with shoes to engage the periphery of the rear wheels, a link connecting said beam and said reach, a brake band encircling a rear wheel hub, brake band operating mechanism mounted on the rear axle, an operative connection between said reach and said brake band operating mechanism and a link connecting said brake band and the swinging support of said brake beam, substantially as described.

6. In combination, a vehicle body; a rear axle affixed to said body; rear wheels on said rear axle; a front axle for said body; wheels for said front axle; a pair of longitudinally registering grooved rollers on said front axle; a bolster provided with a track running on said rollers; a reach attached to said front axle and free from said rear axle; braces having slotted connections with said reach and affixed to said rear axle; crank shafts mounted upon said rear axle and operatively connected with said reach; brake bands operatively connected with said crank shafts and arranged to engage the hubs of the rear wheels; brake blocks arranged to be applied to the periphery of the rear wheels; an operative connection between said brake bands and said brake blocks, substantially as described.

7. In combination, a vehicle body; a bolster for said body, with a longitudinal track on the underside of said bolster; a front axle; grooved rollers on said front axle arranged to receive said track; and braking mechanism arranged to be applied by movement of said vehicle body relative to said front axle, substantially as described.

8. In combination, a vehicle body; a bolster for said body with a longitudinal track on the underside of said bolster; a front axle; grooved rollers on said front axle arranged to receive said track; stop arms pivotally connected with said front axle and having limited sliding motion with reference to said bolster; and braking mechanism operable through motion of said body relative to said front axle, substantially as described.

9. In combination, a vehicle body, a front bolster a front axle, a connection between said bolster and said axle permitting relative movement thereof, arms pivotally connected at one end to said front axle and at the other to said bolster, and braking mechanism operable through the motion of the body relative to the front axle, substantially as described.

In testimony whereof I have signed my name to this specification in the presence of two subscribing witnesses.

LAWRENCE W. SEIVERT.

Witnesses:
O. W. MARSHALL,
E. E. POWDERLY.